US006985273B2

(12) United States Patent
Kang et al.

(10) Patent No.: US 6,985,273 B2
(45) Date of Patent: Jan. 10, 2006

(54) ELECTRO-ABSORPTION OPTICAL MODULATOR HAVING MULTIPLE QUANTUM WELL

(75) Inventors: Young Shik Kang, Daejon-Shi (KR); Je Ha Kim, Daejon-Shi (KR); Ji Youn Lim, Daejon-Shi (KR); Sung Bock Kim, Daejon-Shi (KR)

(73) Assignee: Electronics and Telecommunications Research Institute, Daejon-Shi (KR)

( * ) Notice: Subject to any disclaimer, the term of this patent is extended or adjusted under 35 U.S.C. 154(b) by 9 days.

(21) Appl. No.: 10/743,463

(22) Filed: Dec. 23, 2003

(65) Prior Publication Data

US 2005/0068601 A1    Mar. 31, 2005

(30) Foreign Application Priority Data

Sep. 29, 2003    (KR) .................... 10-2003-0067338

(51) Int. Cl.
*G02F 1/01*    (2006.01)
(52) U.S. Cl. ..................................... 359/240; 359/248
(58) Field of Classification Search ................ 359/240, 359/237, 245, 248, 260, 276, 284, 285; 372/26, 372/45, 50; 385/1, 2, 14, 131
See application file for complete search history.

(56) References Cited

U.S. PATENT DOCUMENTS

| 5,416,338 | A | * | 5/1995 | Suzuki et al. .................. 257/21 |
| 5,580,818 | A | * | 12/1996 | Sakata .......................... 438/35 |
| 5,822,348 | A | * | 10/1998 | Fujii ............................. 372/45 |
| 5,878,066 | A | * | 3/1999 | Mizutani et al. .............. 372/27 |
| 6,008,066 | A | * | 12/1999 | Kashima et al. .............. 438/31 |
| 6,310,902 | B1 | | 10/2001 | Bylsma et al. |

OTHER PUBLICATIONS

Takanori Iwai, et al.; "Signal Distortion and Noise in AM-SCM Transmission Systems Employing the Feedforward Linearized MQW-EA External Modulator"; Journal of Lightwave Technology, vol. 13, No. 8; Aug. 1995; pp. 1606-1612.
K. K. Loi, et al.; "Linearization of 1.3-μm MQW Electroabsorption Modultors Using an All-Optical Frequency-Insensitive Technique"; IEEE Photonics Technology Letters, vol. 10, No. 7; Jul. 1998; pp. 964-966.
Gordon C. Wilson, et al.; "Predistortion of Electroabsorption Modulators for Analog CATV Systems at 1.55 μm"; Journal of Lightwave Technology, vol. 15, No. 9; Sep. 1997; pp. 1654-1662.

* cited by examiner

*Primary Examiner*—Hung Xuan Dang
*Assistant Examiner*—Tuyen Tra
(74) *Attorney, Agent, or Firm*—Mayer, Brown, Rowe & Maw LLP (57) ABSTRACT

Disclosed is an electro-absorption optical modulator using a semiconductor device. The optical modulator makes use of a change in light absorption caused by displacement of an absorption curve depending on a bias voltage applied to the device. Here, a level of the light absorption depending on the bias voltage is expressed as a transfer function of output light to the applied bias, and the transfer function has a non-linear profile due to a characteristic of a material. Unlike signal modulation of a digital optical communication system, an analog optical transmission system can be subjected to deterioration in performance, because the non-linear characteristic of the transfer function for the optical modulator generates signal distortion when an electrical signal is converted into an optical signal. The typical optical modulator has an absorption layer constituted of quantum wells having the same width. However, the inventive optical modulator has the absorption layer formed by the combination of quantum wells having a width different form each other, thus having excellent linearity.

12 Claims, 8 Drawing Sheets

ELECTRO-ABSORPTION OPTICAL MODULATOR HAVING MULTIPLE QUANTUM WELL

CROSS-REFERENCE TO RELATED APPLICATION

This application claims the benefit of Korean Patent Application No. 2003-67338, filed on Sep. 29, 2003, the disclosure of which is hereby incorporated herein by reference in its entirety.

BACKGROUND OF THE INVENTION

1. Field of the Invention

The present invention relates to an electro-absorption optical modulator and, more particularly, to an electro-absorption optical modulator having a multiple quantum well, in which an absorption layer is formed by combination of quantum wells, each of which has a width different from each other.

2. Description of the Related Art

In digital optical communication systems, a semiconductor optical modulator used for signal modulation typically functions to regulate an intensity of incident light. In other words, an intensity of output light is controlled according to an input electrical signal. In this manner, digital signals, which are subjected to intensity modulation (IM), are simply differentiated as ones (state of "1") having intensity higher than a predetermined reference level and ones (state of "0") having intensity lower than the predetermined reference level.

This semiconductor optical modulator may be not only used to perform IM for digital communication, but also used as an analog optical modulator for controlling an intensity of output light according to an electrical signal having a predetermined frequency. The analog optical modulator has been utilized as the most important signal source in the optical transmission technology for an ROF (Radio-over-Fiber) link, in which an RF (Radio Frequency) signal, on which a signal undergoing digital modulation (e.g., Binary Phase Shift Keying (BPSK), Quadrature Phase Shift Keying (QPSK), Quadrature Amplitude Modulation (QAM), etc.) has been carried, is converted into an optical signal and then transmitted to an optical fiber. Meanwhile, it is most important for the semiconductor optical modulator to minimize modulation distortion of an optical signal for an input electrical signal. This functions to differentiate the analog optical modulator from the digital optical modulator.

Among RF optical modulators, an electro-absorption optical modulator having a multiple quantum well is a device having a high-frequency operating speed, low-power consumption and a capability to be integrated with other devices. For these reasons, the electro-absorption optical modulator attracts attention in the optical transmission technology for the ROF link. However, the electro-absorption optical modulator has a problem that, because of a nonlinearity of an electro-optical transfer function, it is essential to overcome a phenomenon of signal distortion generated when signals are transmitted. The prior arts for overcoming these problems are as follows.

Figure 1A:
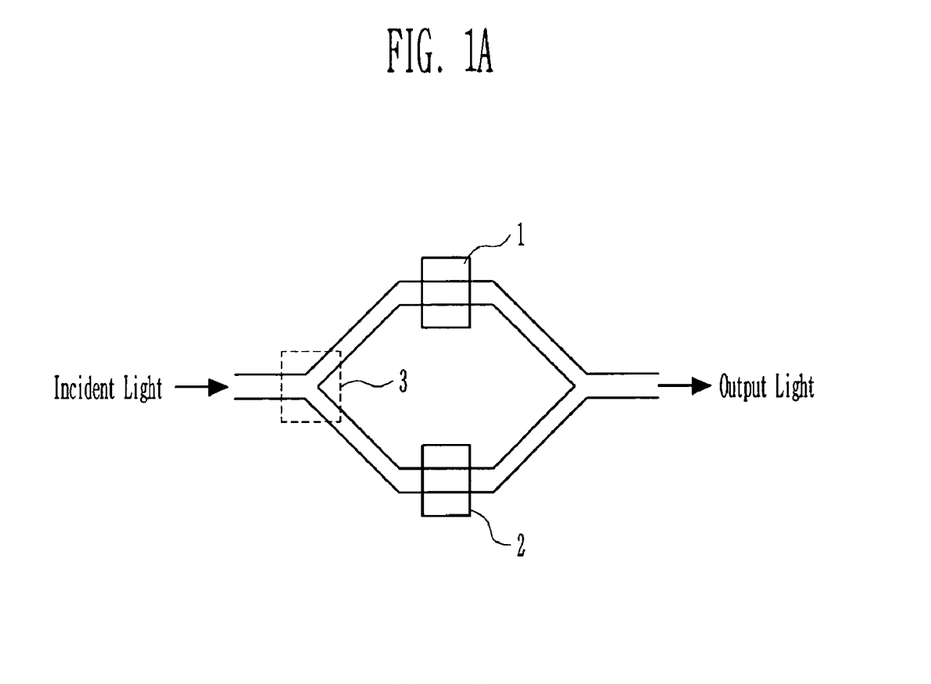
FIG. 1a shows a structure of a conventional optical modulator, in which two electro-absorption optical modulators are integrated.

FIG. 1a shows a structure in which two electro-absorption optical modulators are integrated. In this structure, input optical signals are divided to have the same optical power using a 3-dB coupler 3. After each optical signal is allowed to be incident onto the optical modulators 1 and 2, a bias voltage and a modulation depth are appropriately selected to minimize intermodulation distortion (IMD) caused by non-linearity of a transfer function. That is, by decreasing a value of the IMD, linearity is enhanced.

Figure 1B:
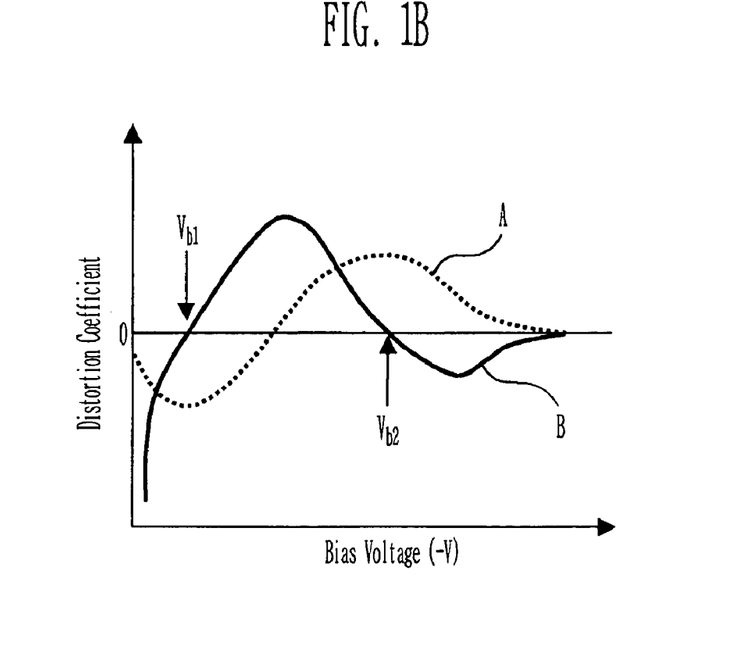

FIG. 1b is a graph of distortion coefficients of transfer functions of two electro-absorption optical modulators. In the case that, when bias voltages to be applied to the optical modulators are selected, two bias voltages $V_{b1}$ and $V_{b2}$ at which a third harmonic distortion value becomes zero (0) are selected, a second order distortion coefficient (line A) has a similar magnitude but an opposite sign at the two bias voltages. Further, a third order distortion coefficient (line B) has a sign changed oppositely around the two bias voltages. That is, the second and third order distortion values can be minimized, and thus linearities of the optical modulators are increased [see M. Shin and S. Hong, "A Novel Linearization Method of Multiple Quantum Well (MQW) Electro-absorption Analog Modulator", Jpn. J. Appl. Phys. Vol. 38 (1999), pp. 2569–2572].

Figure 2:
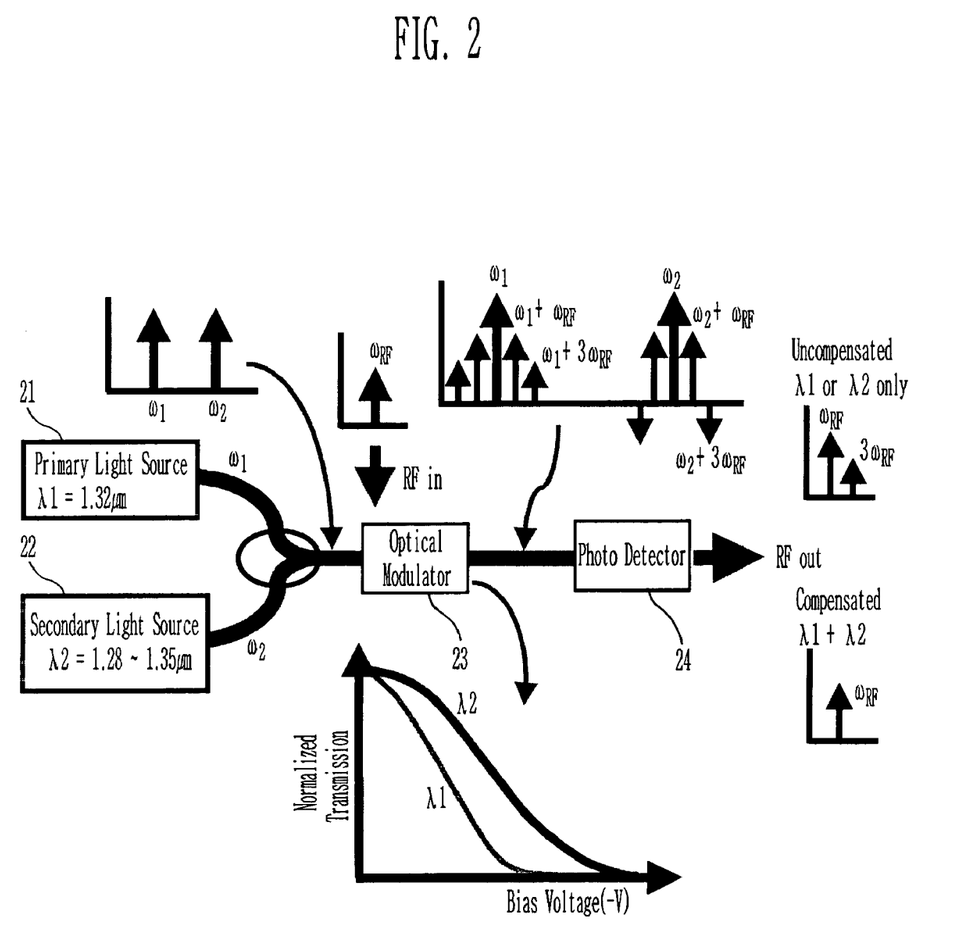
FIG. 2 shows a structure of a conventional optical modulator, in which two different wavelengths of light sources are incident onto an electro-absorption optical modulator.

FIG. 2 shows a structure in which two different wavelengths of light sources are incident onto an electro-absorption optical modulator. According to this structure, light having two carrier frequencies $\omega_1$ and $\omega_2$ are input to enhance linearity, respectively. A wavelength-tunable laser, which is capable of selecting light having a wavelength of 1.32 $\mu$m (frequency: $\omega_1$) as a primary light source 21 and light having a wavelength between 1.28 and 1.35 $\mu$m (frequency: $\omega_2$) as a secondary light source 22, is used. Two kinds of light emitted from the first and secondary light sources 21 and 22 are simultaneously incident onto an optical modulator 23. Here, an RF signal is input into the optical modulator 23 together with a bias voltage. In the case of frequencies of light output through the optical modulator 23, as shown in FIG. 2, each of the carrier frequencies $\omega_1$ and $\omega_2$ is located at the middle position, the RF signal are carried beside each carrier frequency, and synthetic frequencies $\omega_1 + 3\,\omega_{RF}$ and $\omega_2 + 3\,\omega_{RF}$ are located next to the RF signal. When a wavelength of the wavelength-tunable laser is properly adjusted, phases of unwanted frequency terms become 180°. Thus, in the case of optical signals output through a final photodetector 24 such as a high speed photodetector, only a frequency of $\omega_{RF}$ is detected, so that the linearity is enhanced [see K. K. Loi, J. H. Hodiak, X. B. Mei, C. W. Tu and W. S. C. Chang, "Linearization of 1.3-$\mu$m MQW Electroabsorption Modulators Using an All-Optical Frequency-Insensitive Technique", IEEE photon. Technol. Lett., Vol. 10, No. 7, July 1998, pp. 964–966].

Figure 3:
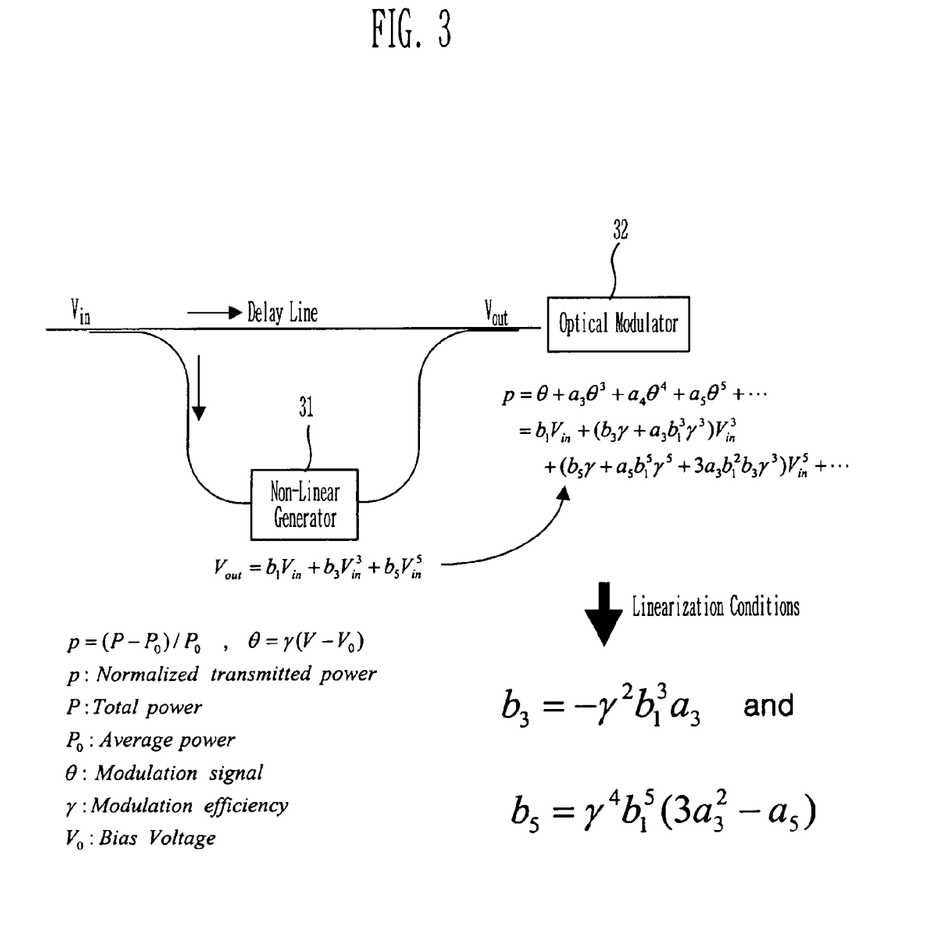
FIG. 3 shows a structure of a conventional optical modulator, in which predistortion is provided to an applied electrical signal.

FIG. 3 shows a structure in which predistortion is provided to an electrical signal applied to an electro-absorption optical modulator. According to this structure, linearity of the optical modulator is enhanced by providing predistortion to the electrical signal carried on the optical modulator. Prior to electrical distortion, a bias voltage of the optical modulator is selected at a point where a second harmonic distortion becomes zero (0), that is at an inflection point of the transfer function. This approach is allowed to leave even-order harmonic terms except a second order term and odd-order harmonic terms. The even-order harmonic terms and odd-order harmonic terms have an influence on the linearity of the optical modulator. In reality, as the order of the harmonic terms becomes higher, their magnitudes are drastically decreased. Thus, with regard to the harmonic distortion, second and third order terms have only to be taken into consideration. However, because the bias voltage is set to have the second order term become zero (0), the electrical signal is distorted so that the third order term may become zero (0). Referring to FIG. 3, an input signal $V_{in}$ is split into two signals, one of which travels along a delay line, and the other is distorted into a signal having odd-order non-linearity by means of a non-linearity generator 31. When combined and input into an optical modulator 32, these signals function to allow odd-order harmonic distortion terms of the transfer function to become minimum, and thus the linearity of the optical modulator 32 is enhanced [see Gordon C. Wilson, Thomas H. Wood, M. Gans, J. L. Zyskind, J. W. Sulhoff, J. E. Johnson, T. Tanbun-Ek, and Paul A. Morton, "Predistortion of Electro-absorption Modulators for Analog CATV Systems at 1.55 μm", J. Lightwave Technol. vol. 15, No. 9, September 1997, pp. 1654–1662].

As mentioned above, up to now, in order to enhance the linearity of the optical modulator, an external light source or an electrical circuit is additionally constructed, which results in a complicated and swelled system. In particular, in the case of a system like an ROF (Radio-on-Fiber) system using a super high frequency as the carrier frequency, because a travel distance of a wave is short, many base stations are required. Therefore, development of technologies capable of enhancing the linearity of the optical modulator in a simpler manner than the prior arts as exemplified above is required.

SUMMARY OF THE INVENTION

It is, therefore, an object of the present invention to provide an electro-absorption optical modulator having a multiple quantum well, having an absorption layer formed by combination of quantum wells, each of which has a width different from each other, thereby changing a characteristic of an electro-optical transfer function.

In order to accomplish this object, there is provided an electro-absorption optical modulator comprising: an absorption layer formed of a quantum well; upper and lower clad layers each formed on upper and lower portions of the absorption layer; and electrodes for applying an electric field to the absorption layer, wherein the absorption layer is formed by combination of two quantum wells having a width different from each other.

Here, the quantum wells are combined by the quantum well having a narrow width and the quantum well having a wide width at a ratio of m:n, where m>n.

BRIEF DESCRIPTION OF THE DRAWINGS

The above and other features and advantages of the present invention will become more apparent to those of ordinary skill in the art by describing in detail preferred embodiments thereof with reference to the attached drawings in which:

FIG. 1b is a graph of a distortion coefficient of a transfer function of the optical modulator shown in FIG. 1a;

FIG. 5a is a cross-sectional view showing an epitaxial structure of the electro-absorption optical modulator shown in FIG. 4a;

FIG. 5b is a diagram showing an absorption spectrum for an electric field measured in the epitaxial structure shown in FIG. 5a;

FIG. 7b shows a characteristic of IMD 3 for the transfer functions of FIG. 7a;

DETAILED DESCRIPTION OF THE INVENTION

According to the present invention, in order to change characteristics of an electro-optical transfer function (hereinafter, referred to as a "transfer function") of an electro-absorption semiconductor optical modulator, an absorption layer formed of a multiple quantum well is constituted by the combination of quantum wells, each of which has a width different form each other. In order to understand the transfer function of the optical modulator, it is important to have a grasp of an operation of the optical modulator among other things. To this end, a brief description about the operation of the optical modulator will be made.

Figure 4A:
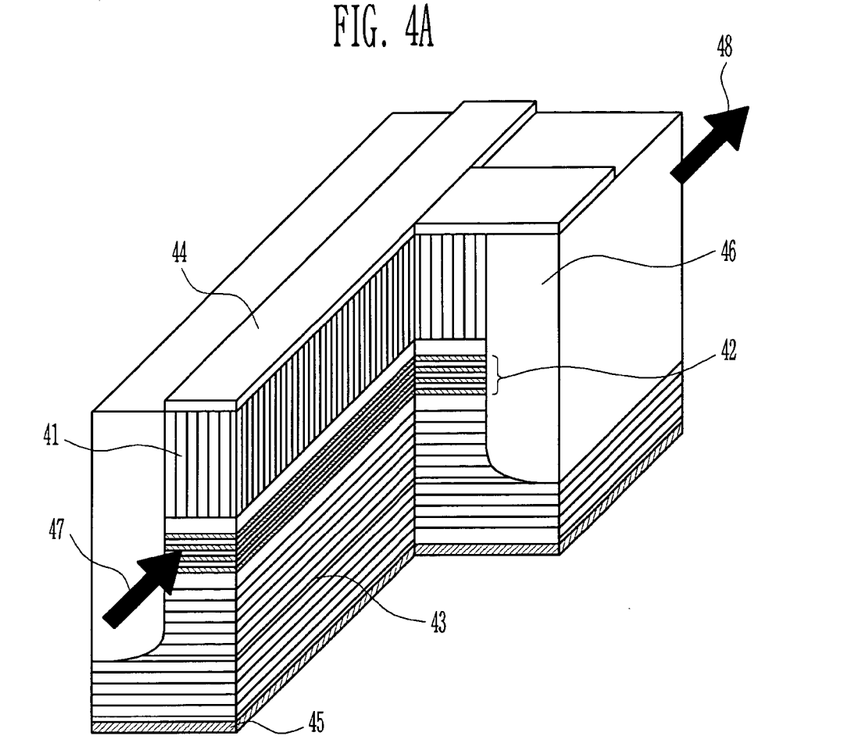
FIG. 4a is a cross-sectional view of an electro-absorption optical modulator according to an embodiment of the present invention.
Figure 5A:
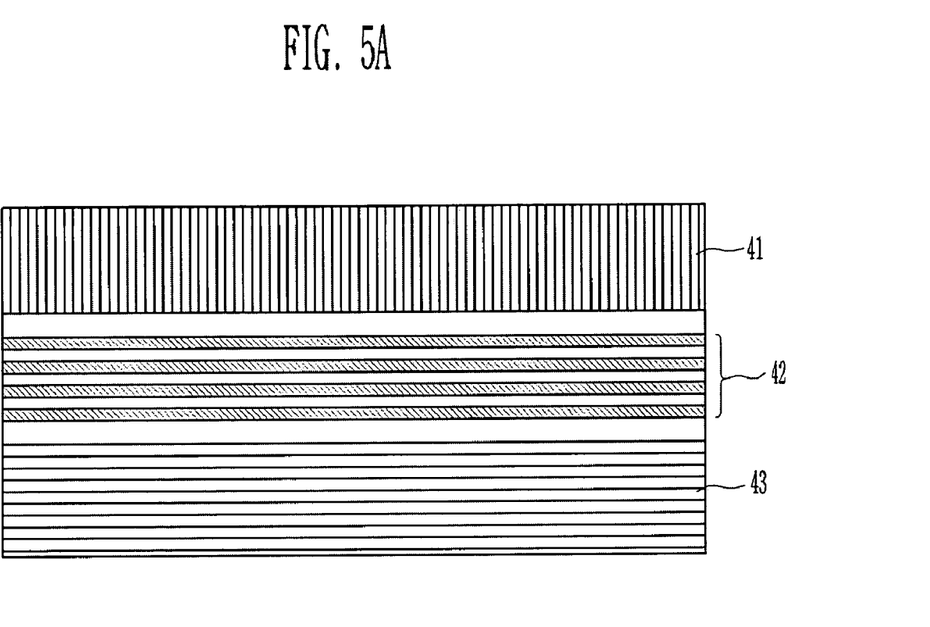

FIG. 4a is a cross-sectional view of an electro-absorption optical modulator according to an embodiment of the present invention, and FIG. 5a is a cross-sectional view showing an epitaxial structure before the electro-absorption optical modulator of FIG. 4a is manufactured.

An absorption layer 42 and a p-type InP clad layer 41 are formed on an n-type InP substrate 43. Under the n-type InP substrate 43 is formed an n-type electrode 45, and on the p-type InP clad layer 41 is formed a p-type electrode 44. In the drawings, among reference numerals, 47 is given for incident light, 48 for output light, and 46 for coated polyimide.

As described above, the epitaxial structure of the optical modulator is formed by a junction of the p-type semiconductor 41, the intrinsic quantum well absorption layer 42 and the n-type semiconductor 43. Modulation of light takes place at the quantum well absorption layer 42.

Figure 5B:
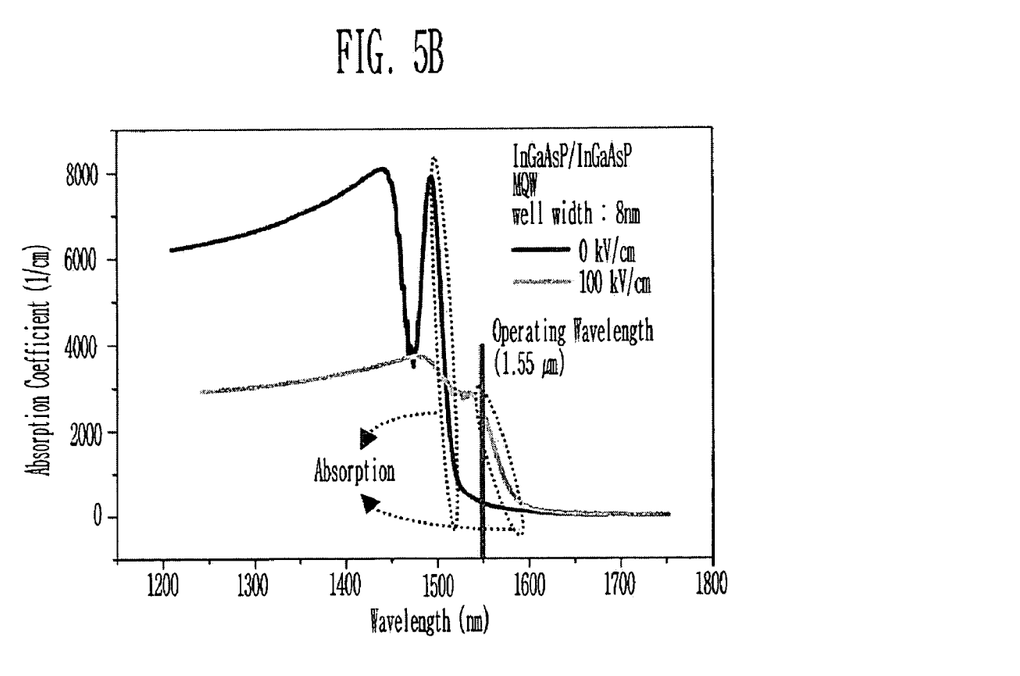

FIG. 5b is a diagram showing a change of an absorption spectrum when an electric field is applied and when an electric field is not applied, in which the absorption spectrum is generated from the quantum well absorption layer 42 shown in FIG. 5a. A region indicated by a dotted line represents an absorption edge of the absorption spectrum. As intensity of applied electric field is increased, the absorption edge is shifted toward the long wavelength. In other words, according to whether or not the electric field is present, absorption happens at a predetermined operating wavelength, thus generating optical modulation. In this case, the operating wavelength (1.55 μm) is located on the side of the long wavelength longer than the absorption edge of the quantum well when the electric field is not applied at a wavelength of incident light at which modulation of optical signals takes place, thus having the incident light pass as it is. Among the operating wavelengths, ones having an influence on optical absorption correspond to the absorption edge of the absorption spectrum. A behavior of the absorption edge controls an operating characteristic of the electro-absorption optical modulator. Among the absorption spectra of the quantum well absorption layer 42, the absorption edge corresponds to an absorption spectrum of an exciton. The absorption spectrum of the exciton caused by application of the electric field is as follows.

The exciton exists in a state in which an electron and a hole are combined by a weak Coulomb force, and energy of the exciton can be represented as in the following Equation 1.

$$E_1(V) = \Delta E_g + E_{1-e}(V) + E_{1-hh}(V) - \text{exciton binding energy}(V) \quad \text{[Equation 1]}$$

where, $\Delta E_g$ is the energy difference (or, the energy band gap) between the materials for the quantum well and the barrier, $E_{1-e}$ is the ground-state energy of the electron, and $E_{1-hh}$ is the ground-state energy of the heavy hole.

In Equation 1, the electric field is associated with the ground-state energy of the electron, the ground-state energy of the heavy hole, and the binding energy of the exciton. Here, the binding energy of the exciton is small. Thus, when the electric field is applied in reality, a change of the ground-state energy of the electron and the heavy hole takes the lead in a change of the binding energy of the exciton. In this case, a change of the absorption spectrum of the exciton to the electric field may be given as a quantum confined stark effect (QCSE) as in the following Equation 2, by which a quantity of change in ground-state energy of the exciton is obtained when the electric field is applied.

$$E_1 - E_1^0 = C_1 \frac{e^2 F^2 (m_e^* L_{eff-e}^4 + m_{hh}^* L_{eff-hh}^4)}{\hbar^2} \quad \text{[Equation 2]}$$

where, $E_1$ is the ground-state energy of the exiton when the electric field is applied, $E_1^0$ is the ground-state energy of the exciton when the electric field is not applied, $C_1$ is the constant having the value of $-2.19 \times 10^{-3}$, $m_e^*$ and $m_{hh}^*$ are effective masses of the electron and the heavy hole respectively, F is the intensity of the electric field, $L_{eff-e}$ and $L_{eff-hh}$ are effective widths of wells for the electron and the heavy hole, respectively.

The effective width of the well refers to a width of an infinite quantum well, which has ground-state energy equal to that in a finite quantum well. When the electric field is applied, a decrease of the ground-state energy of the exciton is proportional to the fourth power of the effective width of the well and the square of the intensity of the electric field. This decrease of the ground-state energy of the exciton is equal to displacement of the absorption edge toward the long wavelength in the quantum well. Eventually, it may be said that the displacement of the absorption edge toward the long wavelength depending on the electric field is proportional to the fourth power of the effective width of the well and the square of the intensity of the electric field. FIG. 5b is a graph illustrating an absorption spectrum of the quantum well having a width of 8 nm, and well shows the QCSE. Further, when the electric field is applied to the quantum well, an absorption intensity of the exiton is decreased as well. Therefore, comparing two plotted lines shown in FIG. 5b, it can be seen that, when the electric field is applied, as the absorption edge moves toward the long wavelength, an absorption coefficient becomes small. As such, whether or not the absorption edge is displaced in the quantum well depending to this electric field is used when light is modulated. As can be seen from FIG. 5b, the absorption coefficient in the operating wavelength becomes near to zero (0) when the electric field is not applied, but it is rapidly increased when the electric field is applied. Thus, according to whether or not the electric field is applied, or the intensity of the applied electric field, a change in the quantity of output light over incident light makes it possible for light to be modulated. For instance, in FIG. 5b, when the quantum well has a width of 12 nm, that is, a wider width, a level in which the absorption edge shifts toward the long wavelength will become greater (a level in which the ground-state energy of the exciton is decreased is proportional to the fourth power of the effective width of the well). Therefore, when the electric field is applied, a difference of the shift level of the absorption edge resulting from the width of the quantum well may be used to enhance the linearity of the optical modulator. The transfer function of the optical modulator can be expressed as an exponential function as in the following Equations 3 and 4.

$$P_{out} = P_{in} \exp(-(V/V_0)^\alpha) \quad \text{[Equation 3]}$$

$$P_{out} = P_{in} \exp(-\Gamma \cdot \alpha(V) \cdot l) \quad \text{[Equation 4]}$$

In Equation 3, $P_{out}$ is the intensity of light output from the optical modulator, $P_{in}$ is the intensity of incident light, V is the voltage applied to the optical modulator, $V_0$ is the voltage when output light has an intensity corresponding to $P_{in}/e$, and $\alpha$ is the parameter for expressing a profile of the transfer function, which is related to the width of the quantum well, the energy band gap between the quantum wells, i.e. the composition ratio of the material for the quantum well and the material for the barrier, and the length of the waveguide at which modulation takes place in the optical modulator. In equation. 4, $\Gamma$ (gamma) is the optical confinement factor, $\alpha(V)$ is the absorption coefficient of the quantum well according to the voltage, and l is the length of the waveguide of the optical modulator.

Figure 4B:
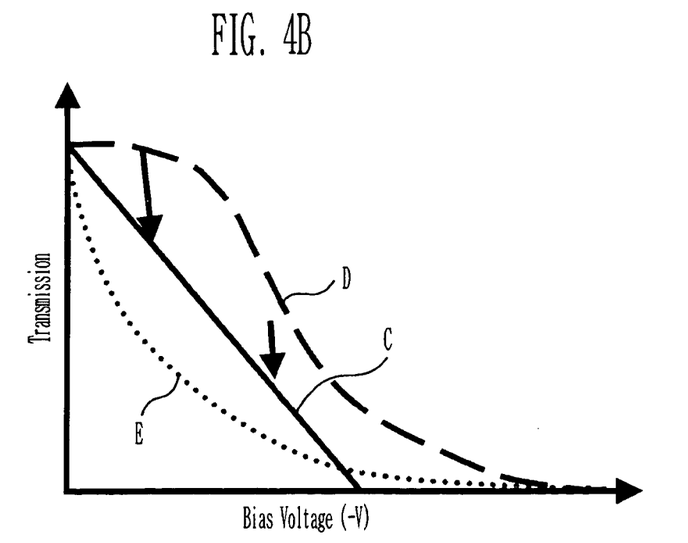
FIG. 4b is a graph showing transfer functions according to a width of a quantum well and an ideal transfer function.

FIG. 4b schematically shows a transfer function, which is measured in the optical modulator constructed as shown in FIG. 4a. A narrow well and a wide well refer to a well having a relatively narrower width and a well having a relatively wider width, respectively. For instance, as illustrated above, the quantum well having a width of 8 nm becomes the narrow well, while one having a width of 12 nm becomes the wide well. In order to understand characteristics of the transfer function which appears at both quantum wells having different widths, the infinite quantum well will be described as one example as follows.

In the infinite quantum well, the ground-state energy of the electron or the hole can be given below as in Equation 5.

$$E_1 = \frac{\hbar^2 \pi^2}{2m^* L} \quad \text{[Equation 5]}$$

where, $E_1$ is the energy of the electron or hole in the ground-state, h is the plank constant, $m^*$ is the effective mass of the electron or hole, and L is the width of the quantum well.

When the width of the well is widened, the energy of the electron or hole becomes smaller. On the contrary, when the width of the well is narrowed, the energy of the electron or hole becomes greater. Thus, the narrow well has the ground-state energy of the exciton greater than that of the wide well. This means that a detuning energy of the operating wavelength becomes greater (herein, the detuning energy refers to an energy corresponding to a difference between the ground-state energy of the exciton when the electric field is not applied and the energy of the operating wavelength). To be more specific, because the absorption edge of the narrow well is farther away from the operating wavelength than that of the wide well, the absorption edge of the narrow well requires a greater electric field to reach the operating wavelength. Thus, absorption in the optical modulator hardly occurs until the absorption edge of the narrow well reaches close to the operating wavelength. However, such absorption drastically occurs when the absorption edge of the narrow well reaches close to the operating wavelength. Further, in the case of the wide well, because the ground-state energy of the exciton is nearer to the operating wavelength, absorption is drastically initiated from a low voltage region. Thus, as to the profile of the transfer function, the narrow well is different from the wide well as in FIG. 4$b$. In FIG. 4$b$, a straight line C represents the transfer function of the ideal optical modulator, in which no signal distortion is generated. To obtain this transfer function, a line D for the narrow well may be appropriately combined with a line E for the wide well. If so, it is possible to obtain the transfer function, which is almost close to a straight line like the line C, within a specified voltage range.

How should each transfer function be combined, then? In order to combine the transfer functions, a mathematical approach is employed under the simple assumption. Assuming that there are two optical modulators, one of which has an absorption layer formed of the narrow well and the other has an absorption layer formed of the wide well, and that the two modulators have only a difference in the widths of the quantum wells which are located in the absorption layers, but no difference in all characteristics (e.g., epitaxial structure, width and length of waveguide, doping concentration, etc.) including the composition ratios of materials and the total thicknesses of the absorption layers, transfer functions of the two optical modulators can be each given as in the following Equations 6 and 7.

$$P_1(V)=P_{in}\exp(-\Gamma \cdot \alpha_1(V) \cdot l) \quad \text{[Equation 6]}$$

$$P_1(V)=P_{in}\exp(-\Gamma \cdot \alpha_2(V) \cdot l) \quad \text{[Equation 7]}$$

In Equations 6 and 7, $P_1(V)$ and $P_2(V)$ are the intensities of light output from the first and second optical modulators respectively, $P_{in}$ is the intensity of incident light, $\Gamma$ (gamma) is the optical confinement factor, $\alpha_1(V)$ and $\alpha_2(V)$ are the absorption coefficients depending on voltages of the narrow and wide wells respectively, l is the length of the waveguide at which optical modulation occurs.

If a new third optical modulator has a ratio of m:n, where m indicates the narrow well in which the absorption layer has a width of $L_1$ and n indicates the wide well in which the absorption layer has a width of $L_2$, and is equal to the first and second optical modulators in the thickness of the absorption layer and all other structures, the third optical modulator will have the same optical confinement factor as the first and second optical modulators. Assuming that, in the absorption layer of the third optical modulator, optical fields distributed at each well are same, the optical confinement factor will become a ratio of $L_1 \cdot m$: $L_2 \cdot n$ for the narrow well and the wide well. Therefore, a transfer function of the third optical modulator can be represented as in the following Equation 8.

$$P_3(V) = P_{in}\exp\left(-\alpha_1(V) \cdot \Gamma \frac{mL_1}{mL_1+nL_2} \cdot l - \alpha_2(V) \cdot \Gamma \frac{nL_2}{mL_1+nL_2} \cdot l\right) \quad \text{[Equation 8]}$$

$$= (P_{in}\exp(-\alpha_1(V) \cdot \Gamma \cdot l))\frac{mL_1}{mL_1+nL_2} \cdot (P_{in}\exp(-\alpha_2(V) \cdot \Gamma \cdot l))\frac{nL_2}{mL_1+nL_2}$$

$$= P_1^{\frac{mL_1}{mL_1+nL_2}}(V) \cdot P_2^{\frac{nL_2}{mL_1+nL_2}}(V)$$

Next, it will be explained about the linearity of the transfer function combined as in Equation 8. The linearity of the optical modulator can be evaluated by intermodulation distortion (IMD). When two signals are applied to the third optical modulator, an applied voltage can be given as the following Equation 9.

$$V=V_b[1+m_r(\cos \omega_1 t + \cos \omega_2 t)] \quad \text{[Equation 9]}$$

where $V_b$ is the bias voltage, and $m_e$ is the electrical modulation depth. Equation 9 is substituted into V of Equation 8, and then the substituted Equation 8 is subjected to Taylor expansion for V and arrangement. Thereby, harmonic frequency terms for each frequency signal (fundamental frequency) are obtained. These are to be generated due to the non-linearity of the transfer function of the optical modulator, and a ratio of additional signal generated by the fundamental and harmonic signals becomes IMD. IMD2 (second order intermodulation distortion) and IMD3 (third order intermodulation distortion) are arranged as in the following Equations 10 and 11.

$$IMD2 = 20 \cdot \log\left(\left|\frac{P_3''(V_b)}{2P_3'(V_b)}\right|(m_e V_b)\right) \quad \text{[Equation 10]}$$

$$IMD3 = 20 \cdot \log\left(\left|\frac{P_3'''(V_b)}{8P_3'(V_b)}\right|(m_r V_b)^2\right) \quad \text{[Equation 11]}$$

Particularly, in a suboctave link as in the ROF system, IMD 3 becomes an important index for determining the linearity. In Equations 10 and 11, $P'''_3(V_b)$, $P''_3(V_b)$ and $P'_3(V_b)$ are third, second and first order differential values of the transfer function of the third optical modulator, respectively.

Figure 6A:
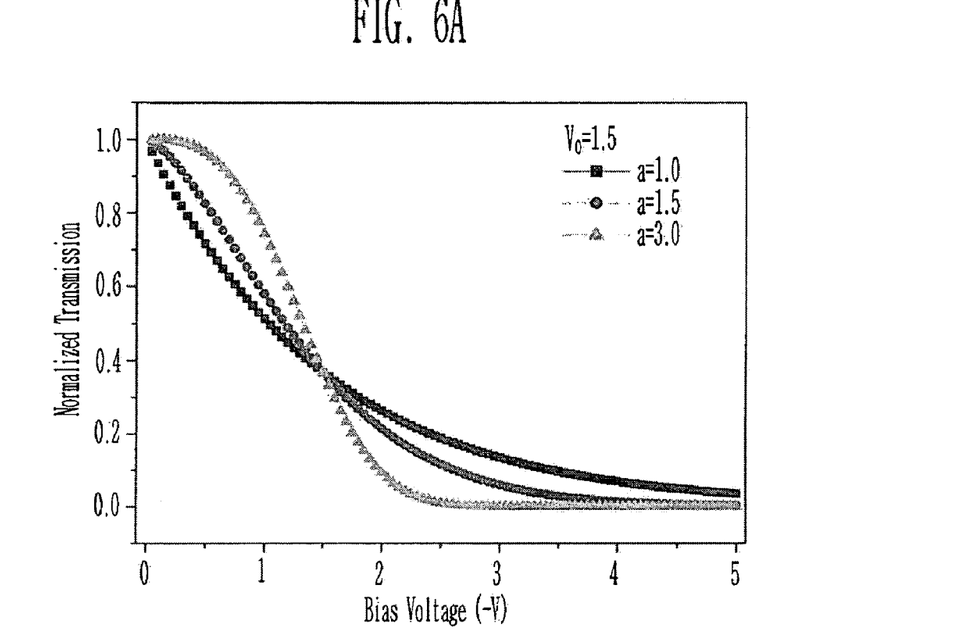
FIGS. 6a and 6b are graphs showing profiles of transfer functions for values of $V_0$ and α.
Figure 6B:
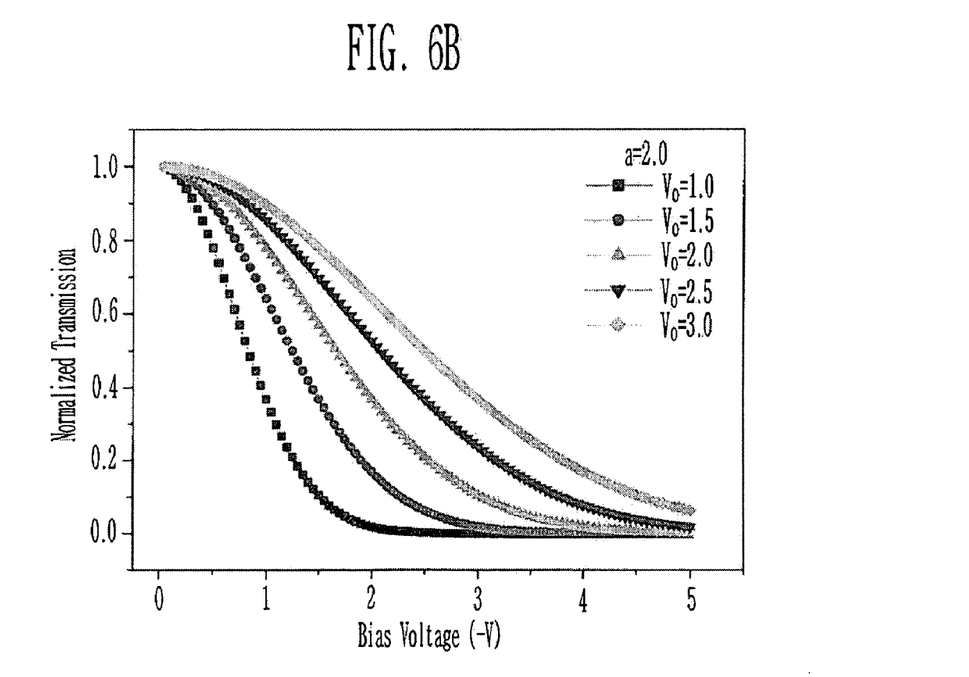
Figure 7A:
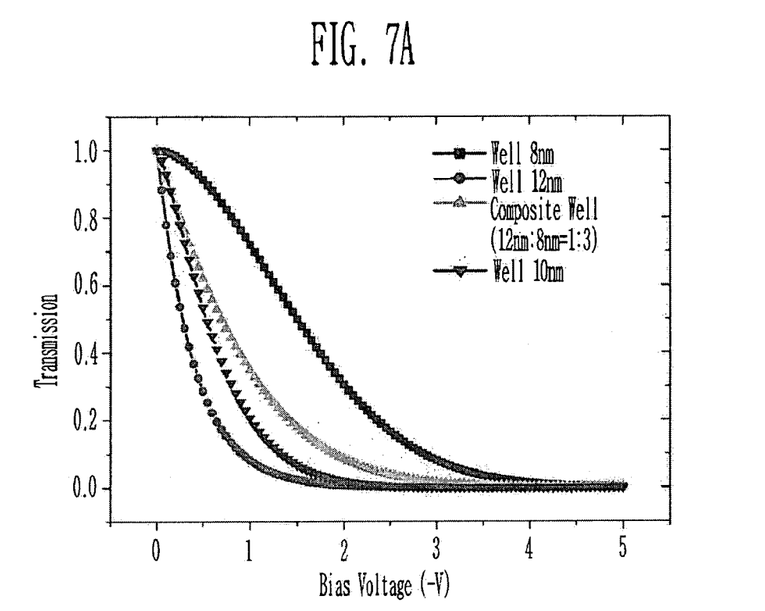
FIG. 7a is a graph showing various transfer functions for quantum wells having widths of 8 nm, 10 nm and 12 nm, and for a composite quantum well having a combined width of 8 nm and 12 nm.

Now, it will be explained which combination of the quantum well can enhance the linearity. A profile of the transfer function of the electro-absorption optical modulator can be expressed as a form of the exponential function like Equation 3. Compared with Equation 3, the transfer function of the actually manufactured optical modulator is well matched with Equation 3. In conclusion, the profile of the transfer function for a certain quantum well can be expressed by a and $V_0$. FIGS. 6a and 6b show profiles of transfer functions for values of $V_0$ and a, respectively. Generally, in the electro-absorption optical modulator, a and $V_0$ has a value less than 4, wherein a is a parameter related to the width of the quantum well and the energy band gap between the quantum wells, or the composition ratio of the quantum well material and the barrier material and the length of the waveguide at which modulation occurs in the optical modulator. The farther the absorption edge becomes apart from the operating wavelength as well as the slower the absorption edge moves for the electric field, the greater the parameter of a becomes. In other words, when the composition ratio of the quantum well material and the barrier material is adjusted to make the energy gap increased, a tends to become increased. Further, when the width of the quantum well becomes narrow even though the composition ratio is equal, the absorption edge of the exciton further moves toward a short wavelength, and thus a tends to become great. Therefore, as compared with the narrow well, the wide well has the absorption edge of the exciton located closely to the operating wavelength, as well as the shift level of the absorption edge toward the long wavelength for the electric field is greater than that of the narrow well, the wide well has a value of a less than that of the narrow well. While values of a and $V_0$ related to the profile of the transfer function are varied within a given range (i.e., <4), each transfer function is combined using Equation 8, and then the linearity of each transfer function are evaluated using Equation 11. As a result, it can be seen that the linearity is enhanced. Particularly, assuming that two transfer functions are combined, when the transfer function for the wide quantum well has a value of about a=1.0, the linearity is greatly enhanced. FIG. 7a shows a graph of various transfer functions, one of which is for a quantum well having a width of 8 nm, α=1.85, and $V_0$=1.83, another for a quantum well having a width of 10 nm, α=1.32, and $V_0$=0.71, a third for a quantum well having a width of 12 nm, α=1.0, and $V_0$=0.4, and a fourth for a composite quantum well, in which a quantum well having a width of 8 nm and a quantum well having a width of 12 nm are combined at a ratio of 3:1. In FIG. 7a, two transfer functions, one of which is for the quantum well having the width of 8 nm and the other for the quantum well having the width of 10 nm, are measured at an actually manufactured optical modulator, while one transfer function, which is for the quantum well having the width of 12 nm, is based on an theoretically manufactured optical modulator. Fitting parameters for the transfer functions of the manufactured optical modulators are listed on the following Table 1.

TABLE 1

| Parameter | Width of quantum well (8 nm) | Width of quantum well (9 nm) | Width of quantum well (10 nm) | Width of quantum well (>10 nm) |
|---|---|---|---|---|
| a | 1.85 | 1.68 | 1.32 | 1.0~1.3 |
| $V_0$ | 1.83 | 1.08 | 0.71 | 0.3~0.7 |

The wider the width of the quantum well became, the smaller the value of α became. For instance, when the width was 10 nm, the value of α was 1.32. In terms of three kinds of widths, the value of $V_0$ was smaller than the value of α. It can be inferred that, according to this result, when the width of the quantum well becomes greater than 10 nm, the value of α approaches 1.0. Thus, it can be assumed that the quantum well having a=1.0 and $V_0$=0.4 has the width of 12 nm. Even when the width of the quantum well is calculated as 11 nm or 13 nm other than 12 nm, it was ascertained that the linearity of the quantum well was enhanced. In FIG. 7a, the transfer function formed by combination of quantum wells having widths of 8 nm and 12 nm is located between two transfer functions, and has a profile similar to that of the transfer function for a quantum well having a width of 10 nm.

Figure 7B:
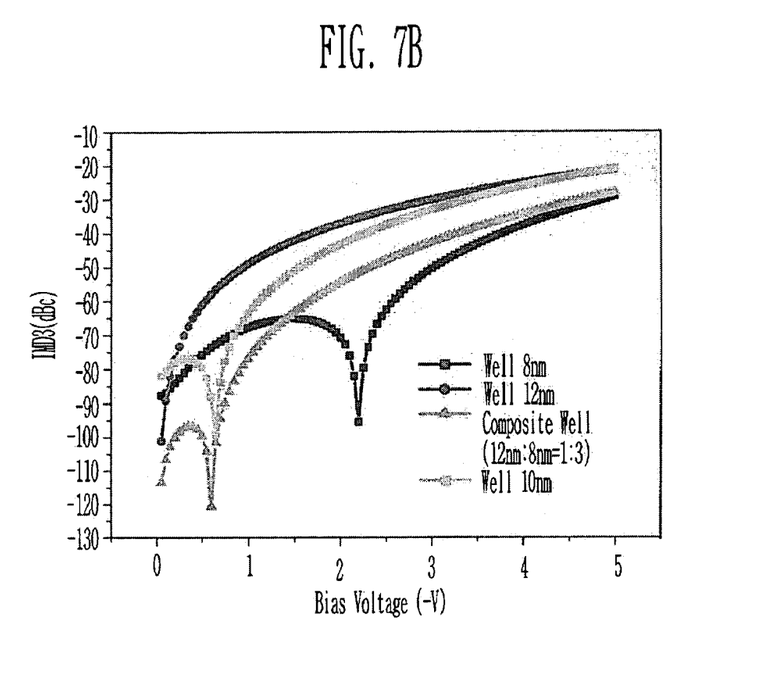

Now, a comparison will be made about how the linearities of two transfer functions are different each other, in which one transfer function is for the quantum well having the width of 10 nm and the other is for the composite quantum well. FIG. 7b shows a characteristic of IMD 3 for the transfer functions of FIG. 7a. It can be seen from FIG. 7b that the transfer function for the composite quantum well has the best characteristic in the IMD 3, and the transfer functions for the single quantum well has almost similar characteristic. In particular, in the case of the transfer function for the quantum well having the width of 12 nm, as the bias voltage is increased, IMD 3 is drastically increased. Thus, it can be seen that the quantum well having the width of 12 nm is not suitable for the absorption layer of the analog optical modulator. Consequently, it can be seen that the transfer function for the quantum well having the width of 10 nm and the transfer function for the composite quantum well have a similar profile but a considerable difference in the linearity, and that the composite quantum well combined by the narrow and wide quantum wells is more suitable for the analog optical modulator requiring high linearity than the quantum wells having the single width.

Up to now, in order to enhance linearity of the electro-absorption optical modulator having a multiple quantum well, a structure in which quantum wells of the absorption layer are combined by narrow wells and wide wells has been described. As a result, as shown in FIG. 4b, transfer functions whose profiles are different from each other are obtained by selection of the wide quantum well and the narrow quantum well, and than, combination of the wide quantum well and the narrow quantum well allows a final transfer function to be enhanced in the linearity.

Figure 8A:
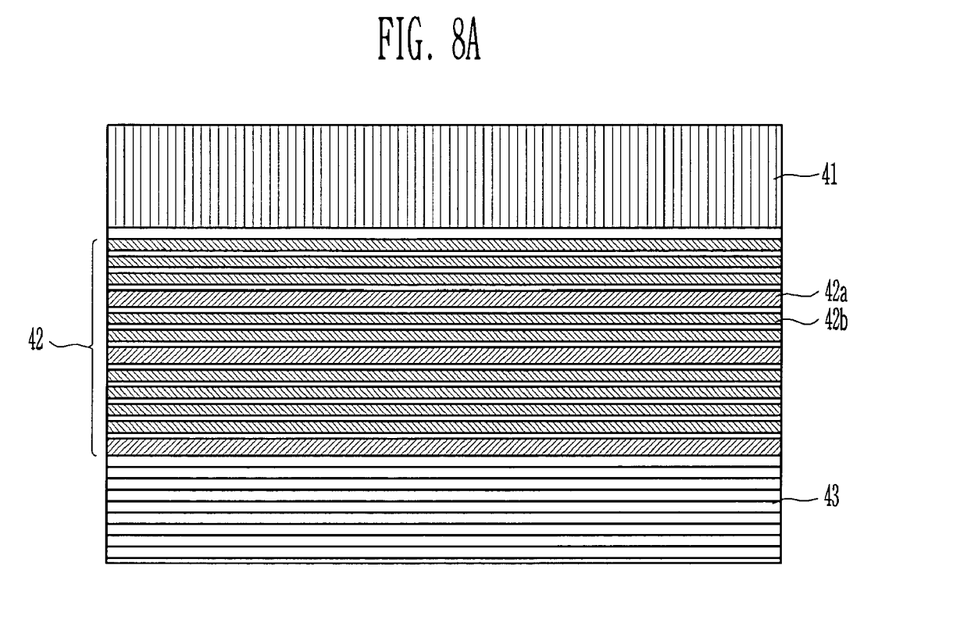
FIG. 8a is a cross-sectional view showing an epitaxial structure of an optical modulator according to a preferred embodiment of the present invention.
Figure 8B:
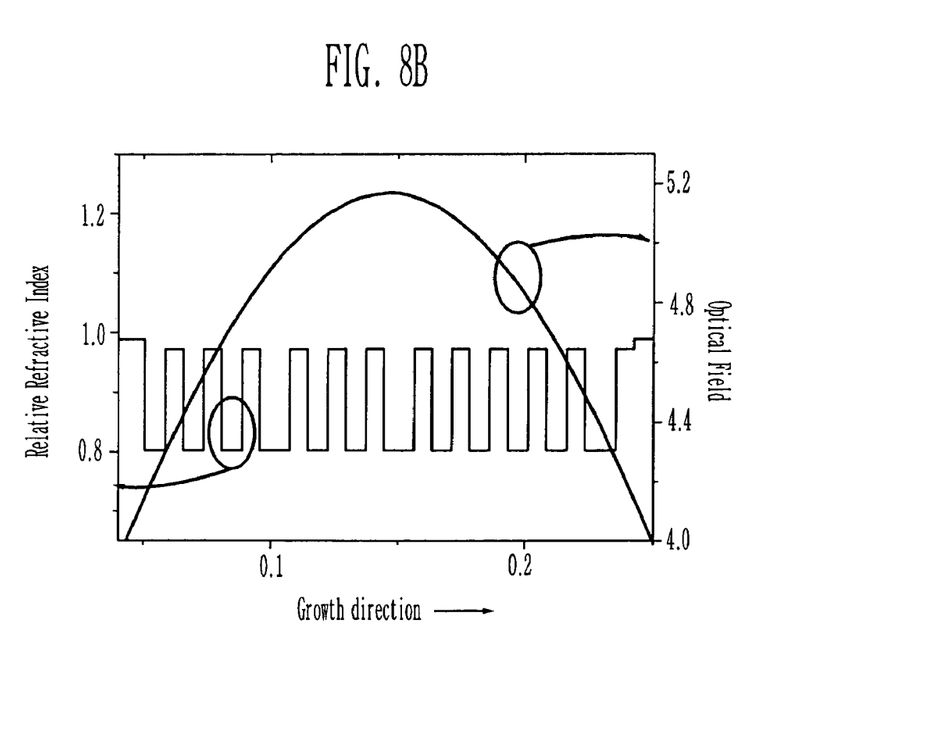
FIG. 8b is a graph showing distribution of an optical field of the absorption layer shown in FIG. 8a and a relative refraction index thereof.

FIG. 8a is a cross-sectional view showing an epitaxial structure of an optical modulator according to a preferred embodiment of the present invention. In this structure, an absorption layer 42 and a p-type InP clad layer 41 are formed on an n-type InP substrate 43. The absorption layer 42 is formed by the combination of a narrow well 42a and a wide well 42b, particularly, at a ratio of 3:1. Here, the combination ratio of 3:1 means the ratio of OCF (Optical Confinement Factor) rather than the ratio of the quantum well. The foregoing description requires assumption that optical fields distributed at each quantum well are equal in order to make the ratios of OCF and the quantum wells identical. However, because the actual distribution of OCF and the optical fields is different according to each region of the absorption layer, the ratio of the quantum well may be equal to or different from the ratio of OCF. FIG. 8b is a graph of an optical field and a relative refraction index of an absorption layer, in which a ratio of an OCF of a narrow well and a wide well and a ratio of the quantum well are 3:1. To make the ratio of OCF of 3:1, the wide wells are disposed in the order of fourth, seventh and twelfth between the narrow wells. However, the ratio of 3:1 is only taken as one example, and thus there may be many combinations for enhancing the linearity within a specified voltage range.

In this embodiment, the n-type InP substrate 43 is used as a lower clad layer. Further, the absorption layer 42 is, for example, formed of a structure of InGaAsP/InGaAsP. In the compound of $In_{(1-x)}Ga_{(x)}As_{(y)}P_{(1-y)}$, when a composition of each component is adjusted by x or y, an energy band gap of InGaAsP is changed. Meanwhile, the barrier and the quantum well have different energy gaps. Thus, when the barrier and the quantum well having compositions different from each other are alternately grown, it is possible to embody the absorption layer of the multiple quantum well.

It should be noted that while the technical spirit of the present invention is specifically described according to the preferred embodiment of the present invention, but such an embodiment is provided only for description, but for limitation. Further, a person skilled in the art will understand that various modifications are possible without departing from the scope of the invention as defined in the appended claims.

As can be seen from the foregoing, an absorption layer of an electro-absorption optical modulator is formed by combination of quantum wells, each of which has a different width. Thus, a change of characteristics of an electro-optical transfer function allows linearity of the optical modulator to be enhanced.

In order to enhance such a linearity, in the prior art, an external optical source or electrical circuit is additionally provided, so that the modulator has a complicated system and an increased volume. However, in the present invention, the modulator is simple but not restricted to an operating speed of the external circuit, and thus it is possible to embody a super high-frequency analog optical transmission system with ease.

What is claimed is:

1. An electro-absorption optical modulator comprising:
   an absorption layer;
   upper and lower clad layers formed on upper and lower portions of the absorption layer, respectively; and
   electrodes for applying an electric field to the absorption layer,
   wherein the absorption layer has a vertical combination of at least two quantum wells having a width different from each other;
   wherein the at least two quantum wells include a first quantum well having a narrow width and a second quantum well having a wide width, the absorption layer having at least one of the first quantum well and at least one of the second quantum well at a number ratio of m>n, where m is the number of first quantum wells and n is the number of second quantum wells; and
   wherein an α value of the first quantum well is larger than an α value of the second quantum well.

2. The electro-absorption optical modulator as claimed in claim 1, wherein the α value of the first quantum well is larger than that of the α value of the second quantum well in the following equation:

$$P_{out}=P_{in}\exp(-(V/V_0)^\alpha).$$

3. The electro-absorption optical modulator as claimed in claim 2, wherein the α value of the first quantum well is larger than that of the second quantum well by at least 0.5.

4. The electro-absorption optical modulator as claimed in claim 1, wherein the absorption layer includes a compound semiconductor base material.

5. The electro-absorption optical modulator as claimed in claim 1, wherein the lower clad layer is formed of a semiconductor substrate.

6. An electro-absorption optical modulator comprising:
   an absorption layer;
   upper and lower clad layers formed on upper and lower portions of the absorption layer, respectively; and
   electrodes for applying an electric field to the absorption layer,
   wherein the absorption layer has a vertical combination of at least two quantum wells including a first quantum well having a narrow width and a second quantum well having a wide width, the absorption layer having at least one of the first quantum well and at least one of the second quantum well at a number ratio of m>n, where m is the number of first quantum wells and n is the number of second quantum wells; and
   wherein an α value of the first quantum well is larger than an α value of the second quantum well in the following equation:

$$P_{out}=P_{in}\exp(-(V/V_0)^\alpha).$$

7. The electro-absorption optical modulator of claim 6, wherein the α value of the first quantum well is larger than that of the second quantum well by at least 0.5.

8. The electro-absorption optical modulator of claim 6, wherein the absorption layer includes a compound semiconductor base material.

9. The electro-absorption optical modulator of claim 6, wherein the lower clad layer is formed of a semiconductor substrate.

10. An electro-absorption optical modulator comprising:
    an absorption layer;
    upper and lower clad layers formed on upper and lower portions of the absorption layer, respectively; and
    electrodes for applying an electric field to the absorption layer,
    wherein the absorption layer has a vertical combination of at least two quantum wells having a width different from each other;
    wherein the at least two quantum wells include a first quantum well having a narrow width and a second quantum well having a wide width, the absorption layer having at least one of the first quantum well and at least one of the second quantum well at a number ratio of m>n, where m is the number of first quantum wells and n is the number of second quantum wells; and
    wherein an α value of the first quantum well is larger than an α value of the second quantum well by at least 0.5 in the following equation:

$$P_{out}=P_{in}\exp(-(V/V_0)^\alpha).$$

11. The electro-absorption optical modulator of claim 10, wherein the absorption layer includes a compound semiconductor base material.

12. The electro-absorption optical modulator of claim 10, wherein the lower clad layer is formed of a semiconductor substrate.

* * * * *